United States Patent
Gill et al.

(10) Patent No.: US 9,369,331 B1
(45) Date of Patent: Jun. 14, 2016

(54) APPLICATION MESSAGE MANAGEMENT

(75) Inventors: Sunbir Gill, Irvine, CA (US); Mayank Arvindbhai Patel, Brea, CA (US); Rahul Ravikumar, Irvine, CA (US); Matthew A. Jones, Ladera Ranch, CA (US)

(73) Assignee: Amazon Technologies, Inc., Seattle, WA (US)

( * ) Notice: Subject to any disclaimer, the term of this patent is extended or adjusted under 35 U.S.C. 154(b) by 433 days.

(21) Appl. No.: 13/431,802

(22) Filed: Mar. 27, 2012

(51) Int. Cl.
G06F 15/16 (2006.01)
H04L 29/08 (2006.01)
H04L 29/06 (2006.01)

(52) U.S. Cl.
CPC .......... H04L 29/08072 (2013.01); H04L 29/06 (2013.01)

(58) Field of Classification Search
CPC .......................... H04L 29/08072; H04L 29/06
USPC .......................................................... 709/219
See application file for complete search history.

(56) References Cited

U.S. PATENT DOCUMENTS

| | | | |
|---|---|---|---|
| 8,488,501 B2* | 7/2013 | Navda et al. ................. | 370/311 |
| 2006/0184657 A1* | 8/2006 | Rezvani et al. .............. | 709/223 |
| 2008/0070632 A1* | 3/2008 | Obuchi et al. ................ | 455/561 |
| 2011/0153728 A1* | 6/2011 | Einarsson et al. ........... | 709/203 |
| 2011/0193780 A1* | 8/2011 | Schaaf .......................... | 345/163 |
| 2011/0213888 A1* | 9/2011 | Goldman et al. ............. | 709/228 |
| 2012/0054487 A1* | 3/2012 | Sun et al. ...................... | 713/158 |
| 2012/0179801 A1* | 7/2012 | Luna et al. .................... | 709/223 |
| 2012/0221877 A1* | 8/2012 | Prabu ............................ | 713/340 |
| 2012/0303774 A1* | 11/2012 | Wilson et al. ................. | 709/223 |
| 2013/0157637 A1* | 6/2013 | Bos .............................. | 455/418 |
| 2013/0166447 A1* | 6/2013 | Theado et al. ................ | 705/44 |
| 2013/0212562 A1* | 8/2013 | Fox et al. ..................... | 717/120 |
| 2013/0244578 A1* | 9/2013 | Bacioccola .................. | 455/41.2 |

* cited by examiner

*Primary Examiner* — Chris Parry
*Assistant Examiner* — Weiwei Stiltner
(74) *Attorney, Agent, or Firm* — Lee & Hayes, PLLC

(57) ABSTRACT

This disclosure is directed to providing notifications to mobile devices, which may piggy-back on other communications exchanged between a mobile device and one or more servers. By piggy-backing, or otherwise adding small amounts of additional data to routine communications, the mobile device may avoid polling the server for notifications of pending messages for the mobile device or reduce a frequency of polling for the notifications. When polling is used to supplement the piggy-backing, a frequency of the polling may be based on a variable threshold amount of time.

18 Claims, 8 Drawing Sheets

APPLICATION MESSAGE MANAGEMENT

BACKGROUND

The advent of application stores, which act as centralized distribution mechanisms for applications (commonly referred to as "apps"), has created new challenges in software distribution and maintenance. In a typical process, a user selects an application and then downloads the application from an application store. At a later point in time, the application may be updated to correct bugs, add new features, or may be updated for other reasons. To obtain the updates, the mobile device may occasionally transmit requests to the application store to check for updates using a process known as polling. Polling requires the device to transmit and then possibly receive a message each time the mobile device checks for a message, which may reoccur in intervals as short as a matter of seconds or as long as a matter of minutes, hours, or days. Polling drains battery power and may subject the user to extra fees for data service by a service provider.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to providing notifications to mobile devices, which may piggy-back on other communications exchanged between a mobile device and a server. By piggy-backing, or otherwise adding small amounts of additional data to routine communications, the mobile device may avoid polling the server for notifications or reduce a frequency of polling the server for the notifications to determine when messages are waiting to be retrieved by the mobile device.

In accordance with some embodiments, the mobile device may add an additional request to a routine communication with the server. The request may instruct the server to determine whether the mobile device has any notifications pending. When notifications are pending, the server may provide an indication to the mobile device along with other data transmitted to the mobile device in the routine communication. The indication may be communicated in the form of a marker in a header of the response, which may flag an availability of the notifications. The routine communications may be any type of ongoing communication the mobile device may exchange with the server, such as providing web content, electronic mail, weather reports, and/or other types of content to the mobile device.

In some embodiments, the mobile device may poll the server to determine whether notifications are available when the mobile device has not communicated with the server for a threshold amount of time, either from polling or from piggy-backing from the routine communications. The threshold amount of time may vary based on one or more factors, which may include a time of the last communication with the server, a use-state of the device (e.g., current tasks performed by the mobile device, remaining battery power, etc.) and/or operational trends of the mobile device (e.g., user activity with the device, etc.).

The techniques and systems described herein may be implemented in a number of ways. Example implementations are provided below with reference to the following figures.

Illustrative Environment

Figure 1:
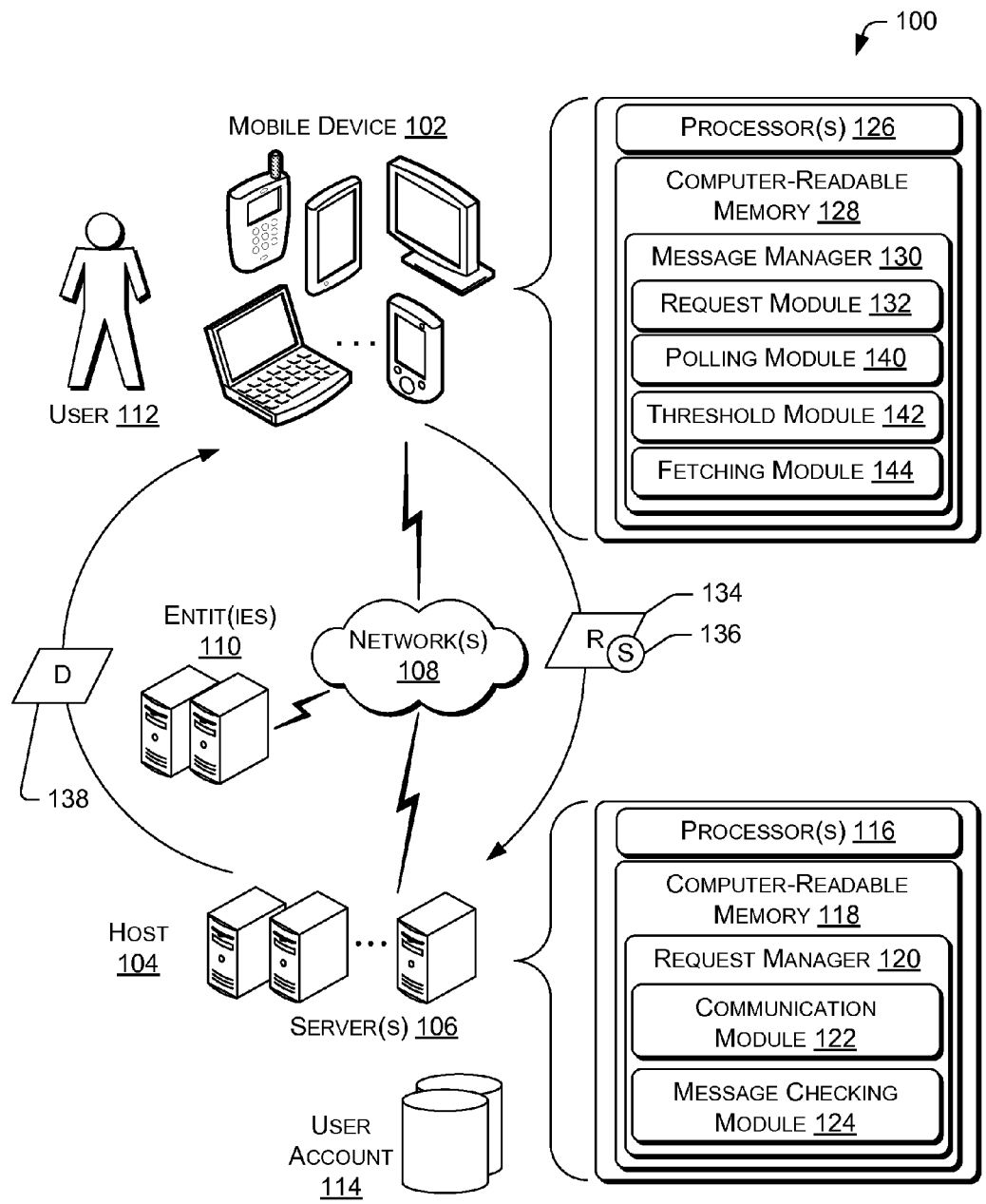
FIG. 1 is a schematic diagram of an illustrative computing environment that enables management of application messages between a mobile device and a host.

FIG. 1 is a schematic diagram of an illustrative computing environment 100 that enables management of application messages between a mobile device 102 and a host 104. The mobile device 102 may include a personal computer, an electronic book reader (e-book reader), a tablet computer, a mobile telephone (including a smartphone), a personal digital assistant (PDA), a television, a set top box, a gaming console, or another electronic, portable or handheld device. The mobile device 102 may exchange data with server(s) 106 of the host 104 using one or more network(s) 108. The host 104 may be implemented as a cloud service using localized or distributed servers, such as a server farm, to exchange data with the mobile device 102 and/or to provide data to the mobile device 102. The network(s) 108 may include wired and/or wireless networks that facilitate communications between the mobile device 102, the server(s) 106, and other entities 110 in the environment 100. In some embodiments, the network(s) 108 may include local area networks (LANs), wide area networks (WAN), mobile telephone networks (MTNs), and other types of networks, possibly used in conjunction with one another, to facilitate communications.

In accordance with various embodiments, the host 104 may provide various services to a user 112 through the mobile device 102. In some embodiments, the host 104 may operate an application store that provides applications for download by the mobile device 102. The host 104 may create content, update content, provide notifications of updated content, provide content, provide messages, or otherwise exchange data with the mobile device 102 via the server(s) 106. The host 104 may also provide content from other parties, such as the entities 110, to the mobile device 102.

The host 104 may maintain many user accounts, which include a user account 114 for the user 112. The user account 114 may include information about the user 112, the mobile device 102, and/or other types of information (e.g., payment information, transaction history, etc.). For example, the host 104 may track in the user account 114 which applications are stored on the mobile device 102 and then periodically determine whether notifications (including updates, messages, and other types of content) are associated with the applications and available for download by the mobile device 102. The notifications may provide the user 112 of the mobile device a notice that messages, updates, or other types of content are available for download by the mobile device. In some embodiments, the notifications may be managed by another entity. In some embodiments, the sign-in process may be used to enable the user 112 to access the user account 114. For example, the sign-in process may be performed using an account identifier (ID), which may be stored by the mobile device 102 and may not require an input of data (e.g., username, password, etc.) by the user 112. The account ID may include credentials that authenticate a session with the host 104 without a need for additional information from the user 112 (e.g., a manual entry of data, etc.).

The server(s) 106 may include one or more processors 116 and computer readable media 118 that stores various modules, applications, programs, or other data. The computer-readable media 118 may include instructions that, when executed by the one or more processors 116, cause the processors to perform the operations described herein for the host 104. In some embodiments, the computer-readable media 118 may store a request manager 120, which may include a communication module 122 and a message checking module 124, each described in turn.

The communication module 122 may facilitate communications between the server(s) 106 and the mobile device 102. The communications may include routine communications such as providing web content, electronic mail, or other types of data as well as polling requests used to determine whether notifications are pending for the mobile device 102.

The message checking module 124 may determine if a communication received by the communication module 122 includes a request for notifications. When the communication includes the request for notifications, the message checking module may check for the notifications. The request may be included in a polling operation or by piggybacking on a routine communication. The message checking module may indicate presence or absence of notifications (or other messages), which may be communicated back to the mobile device 102 via the communication module 122.

Similarly, the mobile device 102 may include one or more processors 126 and computer readable media 128 that stores various modules, applications, programs, or other data. The computer-readable media 128 may include instructions that, when executed by the one or more processors 126, cause the processors to perform the operations described herein for the mobile device 102. In some embodiments, the computer-readable media 128 may store a message manager 130, which may include a request module 132, a polling module 140, a threshold module 142, and a fetching module 144, each described in turn.

The request module 132 may transmit a request 134 and a signal 136 to the server(s) by interacting with the communication module 122. The request 134 may be a routine communication between the mobile device 102 and the server(s) rather than a polling communication used to specifically check for notifications/messages waiting for the mobile device 102. The signal 136, when present (e.g., appended to the request, etc.) may cause the message checking module 124 to check for notifications for the mobile device 102. In some embodiments, the request module 132 may transmit the signal 136 by piggybacking on the request 134, which is a routine communication. The signal 136 may be an indicator in a predetermined field of the request 134 (e.g., header, etc.) to instruct the message checking module 124 to check for the notifications. In response to the request 134, the communication module 122 may respond with data 138, which may include an indication regarding a presence or an absence of the notifications that indicate that messages are waiting for the mobile device 102. By appending or including the signal 136 in the request 134, the mobile device 102 may minimize antenna state transitions that may occur when the mobile device 102 is reliant on polling to determine whether notifications or messages are present at the server 104. Polling traffic regularly engages the antenna on the mobile device 102 causing the power state of the antenna to move from idle-to-low and potentially low-to-high consuming extra power and reducing battery power on the mobile device 102.

The polling module 140 may perform polling by interacting with the communication module 122 to request the message checking module 124 to check for notifications for the mobile device 102. The polling module 140 may perform the poling when no opportunity to piggyback on routine communications is available for a threshold amount of time, as discussed below.

The threshold module 142 may determine the threshold amount of time that may be used to trigger polling when no opportunity to piggyback on routine communications is available by the request module 132. The threshold module 142 may vary the threshold amount of time based on user-observed use patterns, a time since a last request, available battery power, or other information. For example, the polling may become more infrequent as time elapses since a last request from the mobile device 102, or the frequency of the polling may otherwise be varied to preserve battery power of the mobile device 102 or for other reasons.

The fetching module 144 may fetch a message when request module or the polling module determines that a notification is available from the server(s) 106. The fetch module 144 may perform the fetch in response to a user request, automatically after an indication that notifications are presence, or a combination of both.

Illustrative Communications

Figure 2:
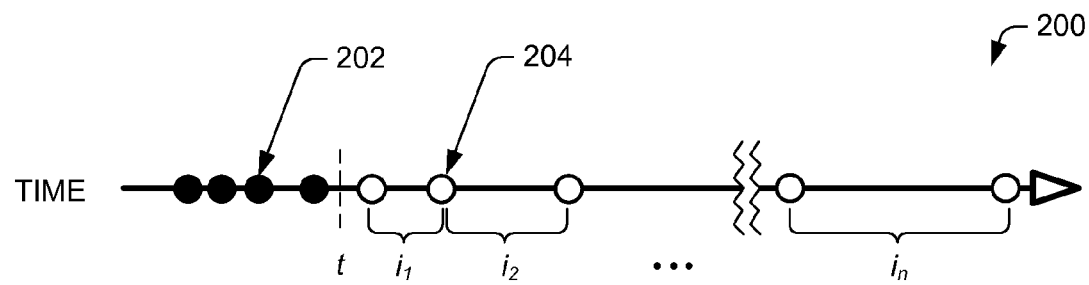
FIG. 2 is a schematic diagram of illustrative communications between the mobile device and the host to manage application messages.

FIG. 2 is a schematic diagram of illustrative communications 200 over time between the mobile device 102 and the host 104 to manage application messages. The illustrative communications show routine communications 202, which may include the signal 136 which is piggybacked with the request 134 from the mobile device 102. The mobile device 102 may exchange the routine communications with the server(s) 106 while the user 112 is interacting with the mobile device 102, or for other reasons. At a time t, the routine communications may terminate or have been terminated, at least temporarily. For example, the user 102 may stop interacting with the mobile device 102, the requested data may be received and satisfy a current need, and so forth. However, the mobile device 102 may continue to check for notifications after time t. In accordance with some embodiments, the mobile device 102 may transmit polling communications 204 to the server(s) 106 to check for notifications at various intervals i when the mobile device is unable to piggyback on the routine communications 202. In various embodiments, the intervals i may vary based on a variable threshold. For example, a relationship may exist such that $i_1 \leq i_2 \leq i_n$. However, the interval may be shortened based on some conditions, as described below, thus $i_n$ may be less than $i_2$, for example.

Figure 3:
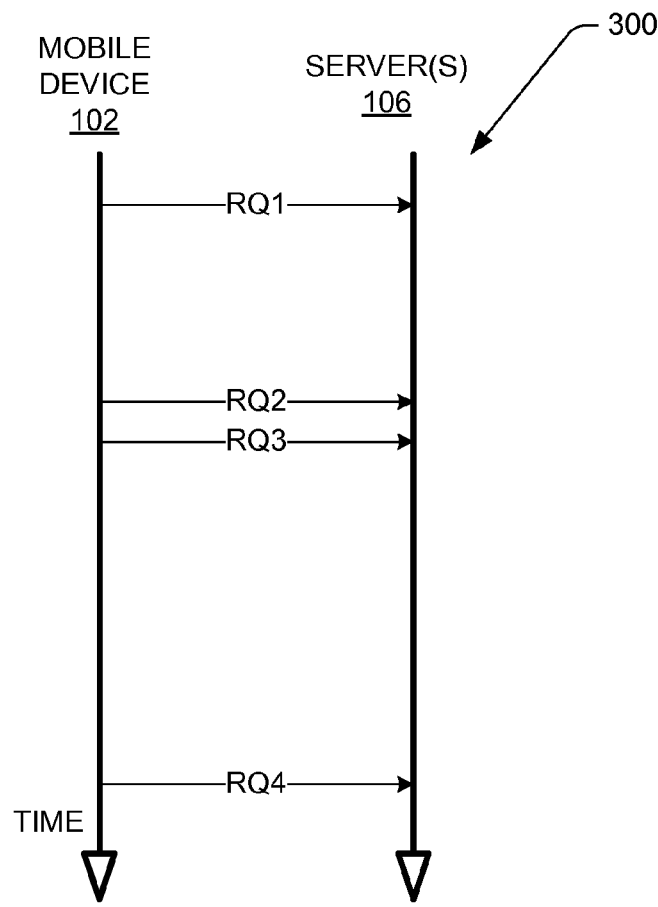
FIGS. 3-5 are additional schematic diagrams of illustrative communications between the mobile device and the host to manage application messages.
Figure 5:
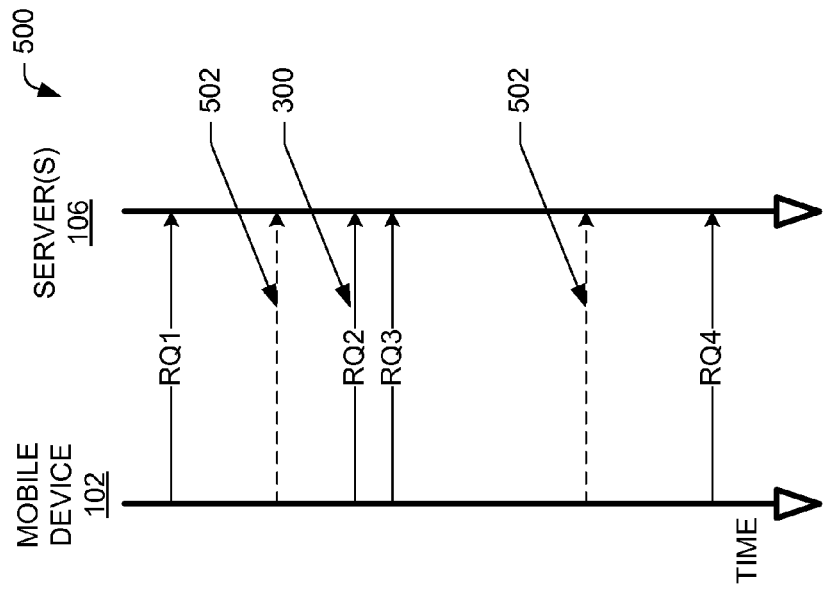
Figure 4:
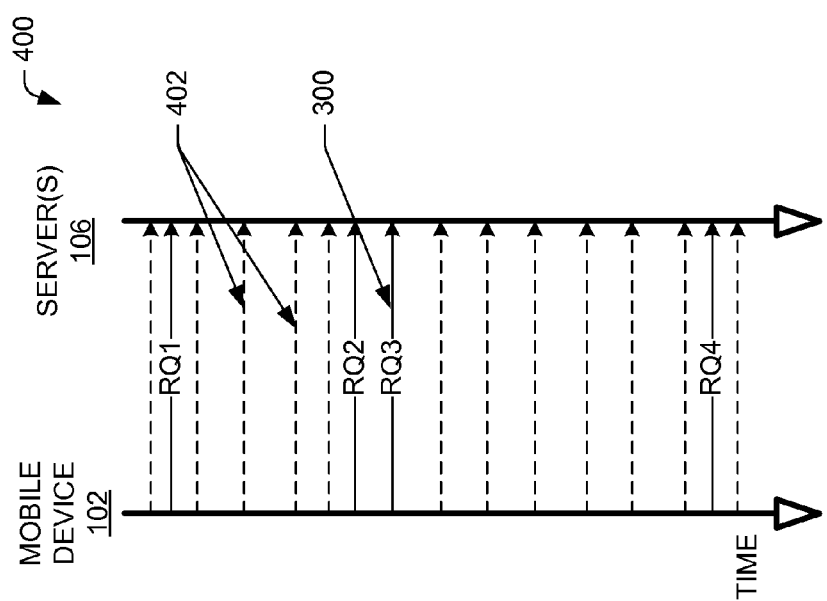

FIGS. 3-5 are additional schematic diagrams of illustrative communications between the mobile device 102 and the server(s) 106 to manage application messages. The illustrative communications are plotted with respect to time.

FIG. 3 shows illustrative requests 300 of routine communications directed from the mobile device 102 to the server(s) 106 over time. The requests 300 may each include the signal 136 or a portion of the requests 400 may include the signal 136. For example, if many requests are transmitted from the mobile device 102 to the server(s) 106 over a relatively short period of time, then the mobile device 102 may only include the signal 136 in some of the requests. However, the mobile device 102 may include the signal 136 in all requests in accordance with some embodiments.

FIG. 4 shows illustrative requests 400 that include the request 300 overlaid with polling communications 402. The polling communications 402 may be inserted between the requests 300 to increase a frequency of checking for notifications when no requests are available to transmit the signal 136 from the mobile device 102 to the server(s) 106. In some embodiments, a power state of the antenna may vary between the various actions, which may cause drain of a battery that powers the mobile device 102. By piggy-backing communications with the request 300, the mobile device 102 may maintain a current power state of an antenna and thereby save battery power.

FIG. 5 shows illustrative requests 500 that include the requests 300 overlaid with variable polling communications 502. In contrast with the illustrative requests 400 shown in FIG. 4, the illustrative requests 500 may be variable and occur after a variable threshold amount of time passes since a last request. The variable threshold is described below with respect to FIGS. 8 and 9.

Illustrative Operation

FIGS. 6-9 are flow diagrams of illustrative processes to manage application messages exchanged between a mobile device and a host. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

The processes are described with reference to the environment 100 and may be performed by the mobile device 102, the server(s) 106, or a combination of both. Of course, the processes may be performed in other similar and/or different environments.

Figure 6:
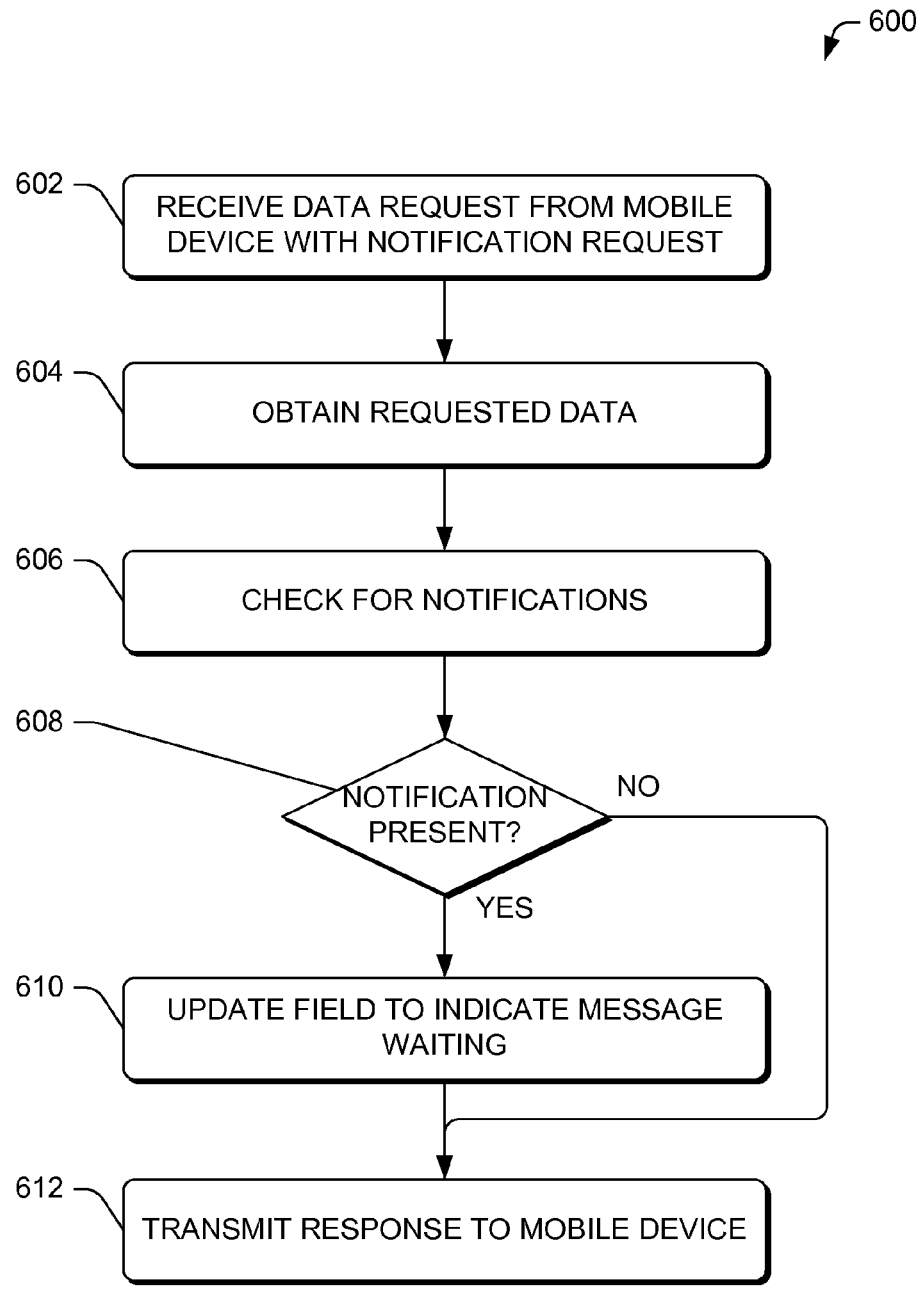
FIG. 6 is a flow diagram of an illustrative process of managing application messages by a server.

FIG. 6 is a flow diagram of an illustrative process 600 of managing application messages by a server. The process 600 may be performed by the request manager 120 of the server(s) 106.

At 602, the communication module 122 may receive a data request from the mobile device 102, such as from the request module 132 of the mobile device. The data request may include the signal 136 that requests the server(s) 106 to check for notifications for the mobile device 102.

At 604, the request manager 120 may obtain the data requested in the data request from the operation 602. The data may be routine data such as web-content, messages, Voice-over Internet Protocol (VoIP) transmissions, software updates and/or other types of data.

At 606, the message checking module 124 may check for notifications. For example, the message checking module 124 run a query to determine whether an indicator for a particular mobile device 102 is set to true or false, thereby indicating whether the particular mobile device has messages to retrieve.

At 608, the message checking module 124 determines whether a notification is waiting. When a notification is present (following the "yes" route), at 610 the message checking module 124 may update a field in a reply message directed to the mobile device 102, the updated field to indicate that a message is waiting, thereby providing the notification to the mobile device. The notification may then be cleared or reset in a table managed by the server(s). At 612, the communication module 122 may transmit the response to the mobile device 102 with an indication of the notification, such as a notification field marked as "true."

When a notification is not present at 608 (following the "no" route from the operation 608), at 612, the communication module 122 may transmit the response to the mobile device 102 without a notification or with a notification field marked as "false."

Figure 7:
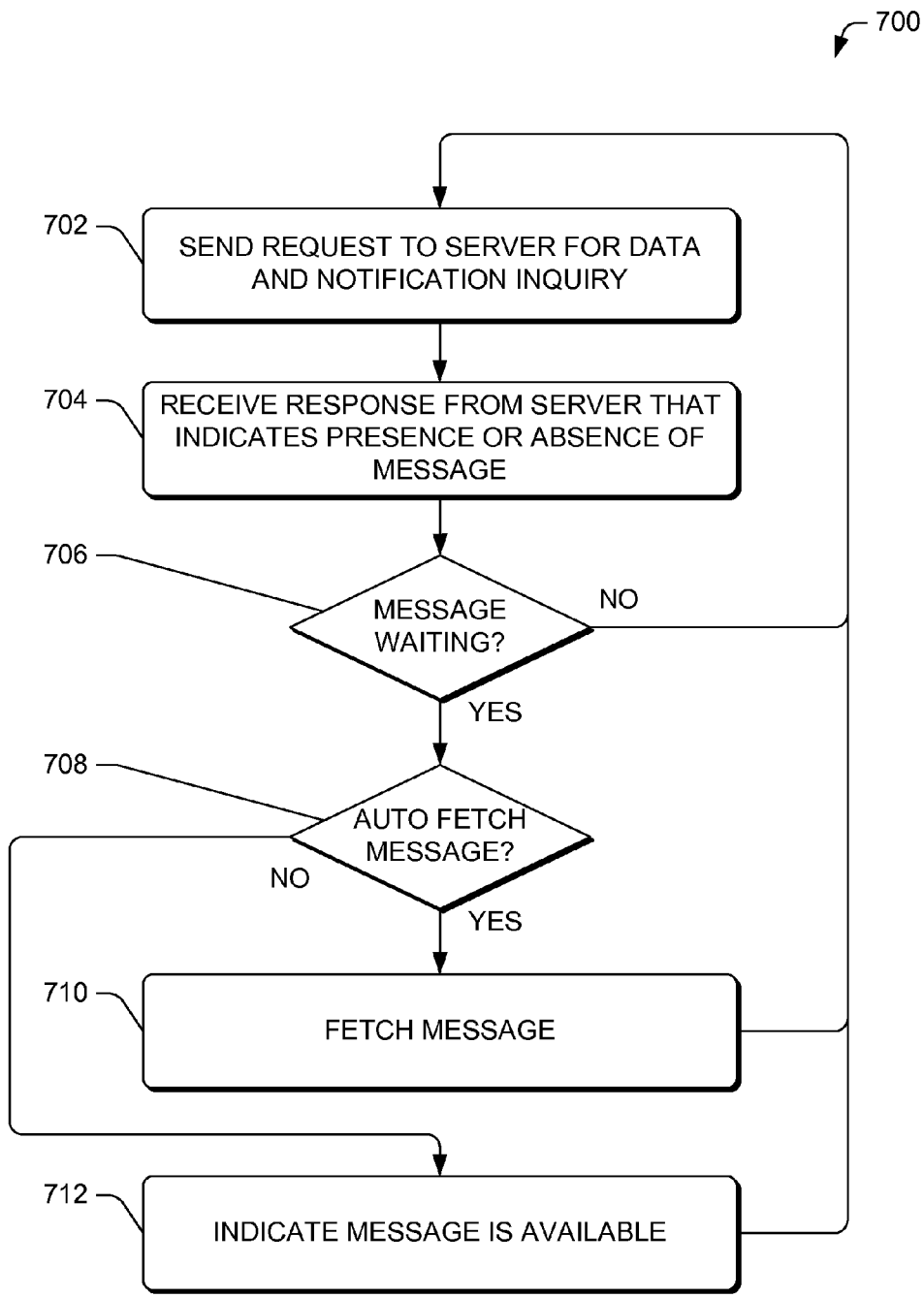
FIG. 7 is a flow diagram of an illustrative process of managing application messages by a mobile device.

FIG. 7 is a flow diagram of an illustrative process 700 of managing application messages by a mobile device. The process 700 may be performed by the message manager 130 of the mobile device 102.

At 702, the request module 132 may transmit a request to the request manager 120 of the server(s) 106. The request may be part of a routine communication and may include a notification inquiry via the signal 136. In accordance with some embodiments, the request module 132 may generate the request 134 and append the signal 136 to the request. The signal 136 may be appended to a header field of the request 134 or another designated portion of the request. In some embodiments, the signal 136 may be a flag that is marked or checked to indicate to the server(s) to check for the notifications.

At 704, the message manager 130 may receive a reply from the request manger 120. The reply may include the data requested from the routine communication as well an indication as to whether messages are waiting for the mobile device 102. For example, the reply may include an indication or a presence or an absence of the messages.

At 706, the message manager 130 may determine whether a message is waiting based on the response received at the operation 704. For example, the request module 132 may parse a response from the server(s) 106 to determine whether a header of the response includes a flag indicating a presence (or absence) of messages. When messages are determined to be waiting (following the "yes" route from the operation 706), then the process 700 may advance to an operation 708. Otherwise (following the "no" route from the operation 606), the process 700 may return to the operation 702 and repeat the request during a next routine communication with the server (s) 106 or other possible communications (e.g., a polling communication, etc.).

At 708, the fetching module 144 may determine whether to automatically fetch the message that is waiting for the mobile device 102. For example, the fetching module 144 may fetch the message without a user-initiated command after determining that messages are waiting. In some instances, the fetching module 144 may delay a threshold amount of time prior to auto fetching the messages or may wait until the mobile device 102 is idle, such as when the mobile device 102 is not performing other functions in response to user requests of in response to other triggers (operating system request, etc.). When the automatic fetch is determined to occur (following the "yes" route from the operation 708), then the fetch module 144 may fetch the message via a request/response communication with the server(s) 106 to obtain the message at 710. When the automatic fetch is determined to not occur (following the "no" route from the operation 708), the process 700 may advance to an operation 712. At 712, the message manager 130 may indicate that a message is available for the user, such as by displaying an icon or other type of notification (sound, etc.). The user may then initiate retrieval of the message via the fetch module 144.

Figure 8:
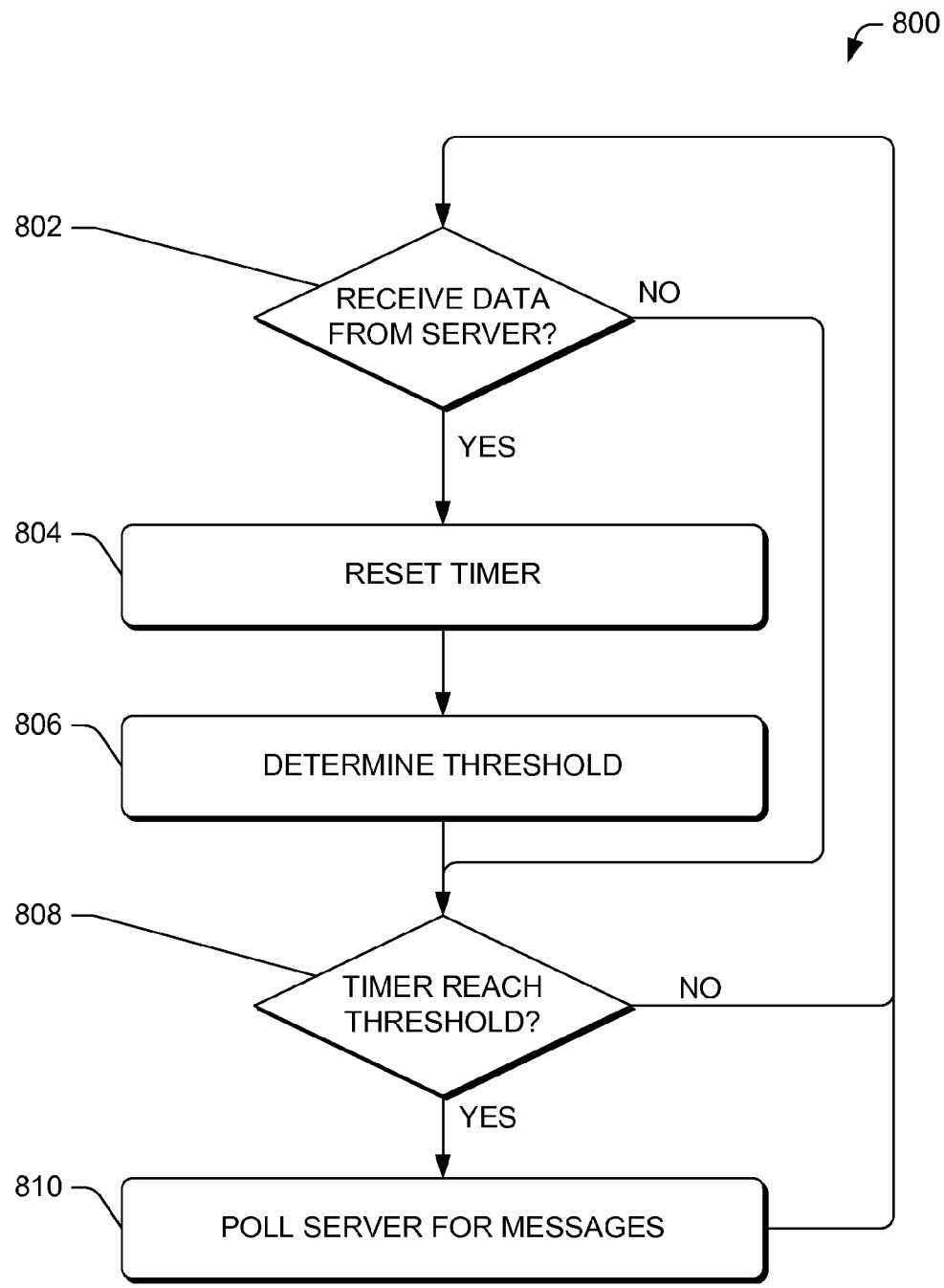
FIG. 8 is a flow diagram of an illustrative process of polling for messages by a client based on a threshold amount of time.

FIG. 8 is a flow diagram of an illustrative process 800 of polling for messages by a client based on a threshold amount of time. The process 800 may be performed by the message manager 130 of the mobile device 102.

At 802, the request module 132 may determine whether data is received from the server(s) 106, where the data includes an indication as to whether messages are waiting for the mobile device 102, as discussed in the operations 704 and 706. When the data is received (following the "yes" route from the operation 802), then the process 800 may advance to an operation 804.

At 804, the threshold module 142 may reset a timer to enable tracking of a last check for notifications/messages by the mobile device 102. The threshold module 142 may store a last time of a request (piggybacked request or polling request), as well as other data such as usage data of the mobile device 102 or other data.

At 806, the threshold module 142 may determine a threshold amount of time, which when reached or exceeded, initiates polling by the mobile device 102 to check for notifications.

At 808, the threshold module 142 may determine whether the threshold has been reached. When the threshold has been reached (following the "yes" route from the operation 808), then the process 800 may advance to an operation 810. At 810, the polling module 140 may poll the server(s) 106 for notifications/messages. Polling may engage the antenna on the mobile device 102 causing the antenna state to move from idle-to-low and potentially low-to-high consuming power and reducing battery-life on the mobile device 102. Illustrative polling is shown in FIG. 5 as the polling communication 502. When the threshold has not been reached (following the "no" route from the operation 808), or after a poling event, the process 800 may advance to the operation 802 and continue in a loop.

Figure 9:
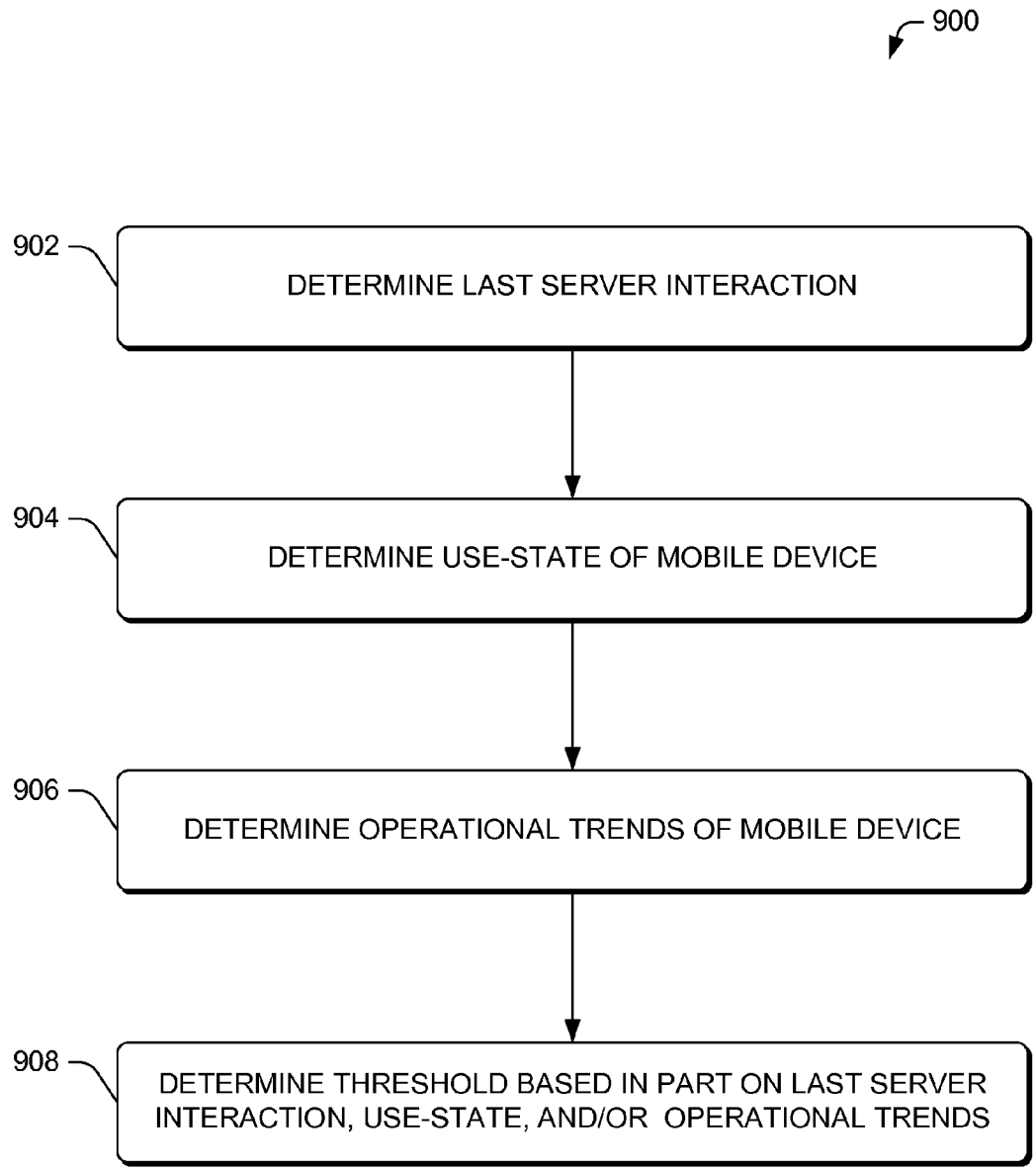
FIG. 9 is a flow diagram of an illustrative process to determine the threshold used in FIG. 8.

FIG. 9 is a flow diagram of an illustrative process 900 to determine the threshold used in FIG. 8. The process 900 may be performed by the threshold module 142 of the mobile device 102.

At 902, the threshold module 142 may determine a last server interaction. For example, the threshold module 142 may determine whether the last server interaction was by polling, by piggybacking on a routine data request, or by other types of server interactions.

At 904, the threshold module 142 may determine a use-state of the mobile device 102. The use-state may indicate whether the mobile device 102 is currently being used, is a power save mode, has low battery power, and so forth.

At 906, the threshold module 142 may determine operational trends of the mobile device 102. For example, the threshold module 142 may determine that the mobile device 102 is not typically used between the hours of 12:00 am and 6:30 am, possibly because the user 112 sleeps during this time. This information may be used to increase the threshold time, for example. The operational trends may also include micro trends based on recent activity to determine if the mobile device 102 is likely to be used again in the near future. For example, after the mobile device 102 is used to transmit a text message, the threshold module 142 may determine that it is likely for the user to interact with the mobile device 102 again in the near future based on known or predetermined trends or rules.

At 908, the threshold module 142 may determine the threshold based at least in part on a last threshold value (which may be calculated using the last server interaction from the operation 902), the use-state of the mobile device 102 from the operation 904, and/or the operational trends from the operation 906. In some embodiments, the threshold value may be increased over time (linearly, exponentially, etc.) to reduce polling frequency due to elapsing of the threshold time (via the operation 910).

Illustrative Architecture

Figure 10:
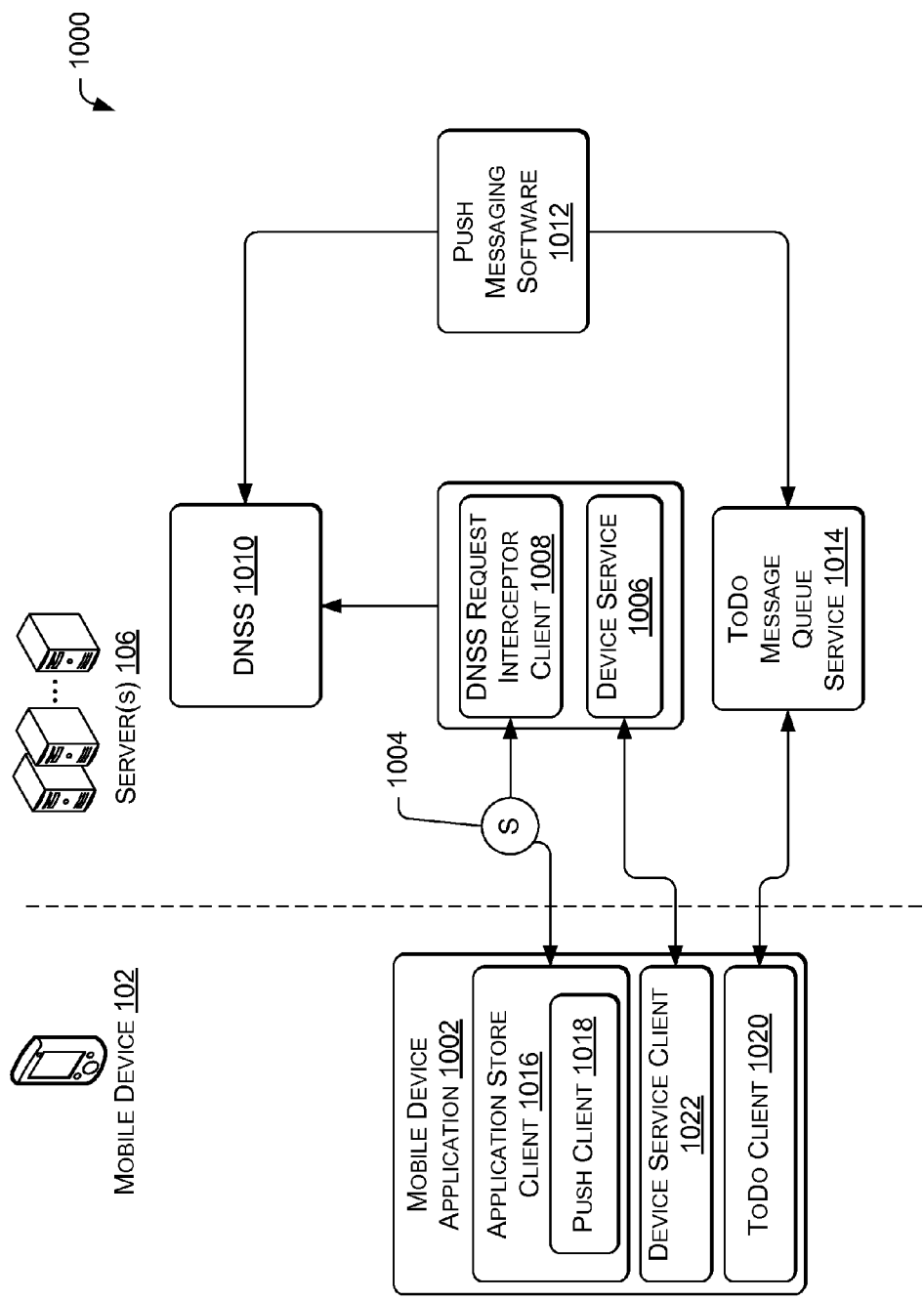
FIG. 10 is a schematic diagram of an illustrative architecture of the mobile device and the host that perform management of application messages.

FIG. 10 is a schematic diagram of illustrative architecture 1000 of the mobile device 102 and the server(s) 106 that perform management of application messages. The architecture 1000 may include a variation of the components shown and discussed with respect to FIG. 1.

A mobile device application 1002 may initiate a request to the server(s) 106 and include a signal 1004, which notifies the server(s) to check for notifications. The request may be a request for routine communications and directed to a device service 1006, which may fulfill the request (provided requested data). A device notification signal service (DNSS) request interceptor client 1008 may receive the request and the signal 1004. The DNSS request interceptor client 1008 may forward the request to the device service 1006 or may only determine a presence or absence of the signal 1004, such as by performing a query. In accordance with some embodiments, the signal 1004 may be included in a hyper text transport protocol (HTTP) header.

When the request includes the signal 1004, the DNSS request interceptor client 1008 may communicate with a DNSS 1010 to determine whether a notification is waiting for the mobile device 102 making the request. For example, the DNSS request interceptor client 1008 may query the DNSS 1010. The DNSS 1010 may act as a queue or table that stores or holds the indications. When a notification is waiting, the DNSS 1010 may provide an indication (e.g., true, etc.), which is communicated back to the mobile device 102 along with a reply from the device service 1006 (in response to the request). The DNSS request interceptor client 1008 or the device service 1006 may forward the indication to the mobile device 102 in the reply, such as by providing a flag in a header or other predetermined cue.

After the DNSS 1010 provides an indication that notifications are available for a particular mobile device 102 to the DNSS request interceptor client 1008, the DNSS 1010 may reset or clear data in the DNSS that indicates presence of the notifications for the particular mobile device 102. A push messaging software 1012 may push messaging (i.e., notifications) to the DNSS 1010 when new notifications are available, which may cause the DNSS 1010 to again indicate that messages are available following a request from the DNSS request interceptor client 1008. The mobile device 102 may be identified by a unique number or type of the mobile device, a device serial number (DSN), an account identifier, and/or other unique data. An example application program interface may include the following:

void setSignal(Device): may set the signal state for the given device to "true," and
    boolean getAndClearSignal(Device): may retrieve the signal state for the given device and reset the value to "false."

Later, the mobile device 102 may request the actual message associated with a notification. The mobile device 102 may transmit a communication to a ToDo message queue service 1014, which may include the message (that corresponds to the notification) from the push messaging software 1012.

In accordance with some embodiments, the mobile device 102 may further include an application store client 1016, which may be used to interact with the application store provided by the server(s) 106. The mobile device 102 may also include a push client 1018, a ToDo client 1020, and a device service client 1022.

The push client 1018 may push messages to application store client 1016. For example the push client 1018 may send notifications to the application store client 1016 to invoke code when there is a message for the mobile device 102. The ToDo client 1020 may talk to the ToDo message queue service 1014. For example, the ToDo client 1020 may talk to the ToDo message queue service 1014 to check a corresponding queue for notifications. The application client 1022 talks to the device service.

In accordance with some embodiments, a DNSS server-side service client may be a Coral request filter. If the request contains a HTTP-header ("X-push-request") requesting a signal check the filter may call DSS.getAndClearSignal and populate the corresponding response header ("X-push-response") with a boolean value of the device signal state. The DSS.getAndClearSignal may have a threshold timeout, which may be aggressive (~50 ms) and will fail-open (no response header set) to minimize an impact on service level impacts (e.g., limit wasted time). An additional response header ("X-push-next") may indicate a next time the client is eligible to submit a request with a signal check header.

A DNSS client-side logic may be managed within the mobile device application 1002. The mobile device application 1002 may populate and parse a signal request and response headers. Upon receiving a response signal state header set to true, the mobile device application 1002 may asynchronously notify the push client utility 1018 to initiate retrieval of the message queue and delivery of the notification. If a server-defined time-delta expires since the last successful receipt of a device signal state response header (e.g. validation via a recurring AlarmManager task) a mobile client can issue a polling request to the service directly via an externalized DSS.getAndClearSignal API. The duration of this delta may exceed that of the polling interval of conventional push notification polled with exponential back-off to leverage the fact that a push notification delay is less perceptible to a user if they are not engaged with the mobile client. Back-off may be employed based on the state of the mobile device 102, i.e. in-use or off. The wait duration used by the client may be provided in the HTTP "X-push-next" header of the response of the externalized DSS.getAndClearSignal API.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
   under control of a mobile device configured with executable instructions,
   generating a request for data from one or more servers;
   appending a request signal to the request to instruct the one or more servers to perform a task to check for one or more notifications associated with the mobile device, the one or more notifications indicating that one or more messages are available for download by the mobile device, the task to check for the one or more notifications being different from and in addition to the request for the data from the one or more servers;
   transmitting, to the one or more servers, the request and the request signal;
   receiving, from the one or more servers, a response that includes the data and a response signal indicating a presence or an absence of the one or more notifications; and
   polling the one or more servers to perform the task to check for the one or more notifications after a threshold amount of time has passed since the receiving the response, the threshold amount of time determined based at least in part on a likelihood of use of the mobile device and operation trends of the mobile device, wherein the operation trends include a period of time during which the mobile device is not transmitting or receiving data and wherein the threshold amount of time is either increased or decreased based at least in part on the likelihood of use of the mobile device.

2. The method as recited in claim 1, further comprising, based at least partly on the response signal indicating the presence of the one or more notifications, fetching the one or more messages corresponding to the one or more notifications from the one or more servers.

3. The method as recited in claim 1, wherein the appending the request signal to the request includes adding a flag to a header field of the request.

4. The method as recited in claim 1, wherein the transmitting the request and the request signal to the one or more servers is performed while maintaining a current power state of an antenna of the mobile device.

5. The method as recited in claim 1, wherein the threshold amount of time is determined based at least in part on a state of the mobile device, the use-state including at least one of a current task being performed by the mobile device or a remaining battery power of the mobile device.

6. A computer-implemented method, comprising:
   receiving a request for data from a mobile device;
   determining, by a request interceptor client, that the request includes a request signal, the request signal including an instruction to perform a task to check for the one or more notifications, wherein the task is different from and in addition to the request;
   upon determining that the request includes the request signal, querying a device notification signal service (DNSS) to determine a presence or an absence of one or more notifications associated with the mobile device, the one or more notifications indicating that one or more messages are available for download by the mobile device; and
   transmitting a response to the mobile device that includes the requested data and a reply signal indicating the presence or the absence of the one or more notifications.

7. The method as recited in claim 6, further comprising determining that the request signal is included in a header field of the request.

8. The method as recited in claim 6, further comprising, forwarding, by the request interceptor client, the request to a device service that fulfills the request.

9. The method as recited in claim 6, further comprising storing, by the request interceptor client, the response signal indicating the presence or the absence of the one or more notifications and causing an update of the DNSS to clear pending notifications.

10. The method as recited in claim 6, further comprising updating the DNSS by a push messaging software that updates the DNSS at a time in which a new message is available for the mobile device.

11. The method as recited in claim 6, wherein the DNSS stores the one or more notifications in association with at least one of a type of the mobile device or a device serial number (DSN).

12. The method as recited in claim 6, further comprising obtaining the requested data for the mobile device.

13. The method as recited in claim 6, further comprising determining that the response includes a header field that provides the response signal indicating the presence or the absence of the one or more notifications.

14. The method as recited in claim 6, wherein a device service obtains the one or more messages associated with the one or more notifications at a time in which the response signal indicates the presence of the one or more notifications.

15. One or more non-transitory computer-readable media storing computer-executable instructions that, when executed on one or more processors, performs acts comprising:
- transmitting, by a mobile device to one or more servers, a request for data, the request including a request signal instructing the one or more servers to perform a task to check for one or more notifications associated with the mobile device, the one or more notifications indicating that one or more messages are available for download by the mobile device, the task to check for the one or more notifications being different from and in addition to the request for the data; and
- receiving, from the one or more servers, a response that includes the data and a response signal indicating a presence or an absence of the one or more notifications; and
- polling the one or more servers to perform the task to check for the one or more notifications after a threshold amount of time has passed since the receiving the response, the threshold amount of time determined based at least in part on a likelihood of use of the mobile device and operation trends of the mobile device, wherein the operational trends include a period of time during which the mobile device is not transmitting or receiving data and wherein the threshold amount of time is either increased or decreased based at least in part on the likelihood of use of the mobile device.

16. The one or more non-transitory computer-readable media as recited in claim 15, wherein the acts further comprise:
- resetting a timer after the receiving the response to track elapsed time since the receiving the response;
- comparing the elapsed time to the threshold amount of time.

17. The one or more non-transitory computer-readable media as recited in claim 16, wherein the acts further comprise determining the threshold amount of time, and wherein the threshold amount of time is variable based on at least one of a use-state of the mobile device or the operation trends of the mobile device.

18. The one or more non-transitory computer-readable media as recited in claim 15, wherein the threshold amount of time is determined based at least in part on a use-state of the mobile device, the use-state of the mobile device including at least one of a current task being performed by the mobile device or a remaining battery power of the mobile device.

\* \* \* \* \*